Oct. 17, 1961  J. R. DEBENPORT, JR  3,004,727
AUTOMATIC FILM CARTRIDGE LOADING MACHINE
Filed Feb. 26, 1960  3 Sheets-Sheet 1

INVENTOR.
JERALD R. DEBENPORT, JR.
BY
McMorrow, Berman & Davidson
ATTORNEYS.

Oct. 17, 1961  J. R. DEBENPORT, JR  3,004,727
AUTOMATIC FILM CARTRIDGE LOADING MACHINE
Filed Feb. 26, 1960  3 Sheets-Sheet 2
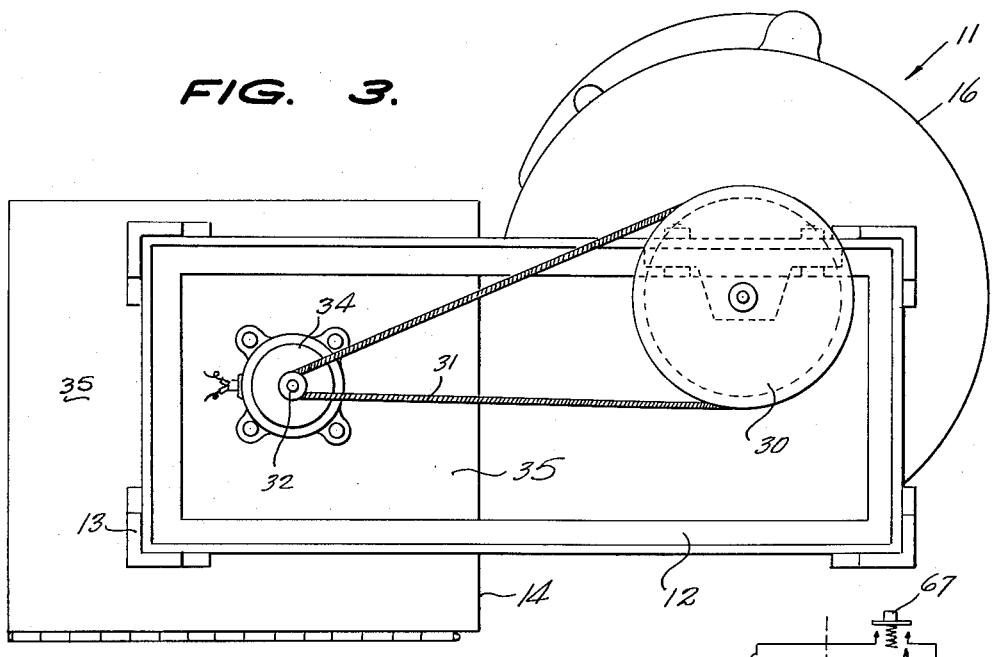
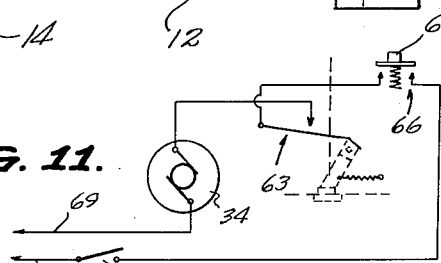
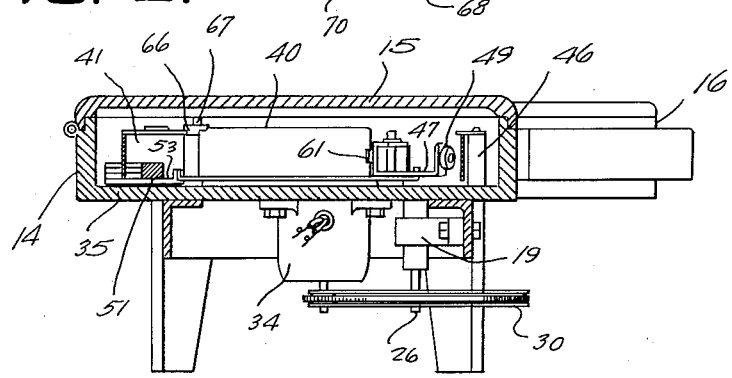
INVENTOR.
JERALD R. DEBENPORT, JR.
BY
McMorrow, Berman + Davidson
ATTORNEYS.

Oct. 17, 1961 J. R. DEBENPORT, JR 3,004,727
AUTOMATIC FILM CARTRIDGE LOADING MACHINE
Filed Feb. 26, 1960 3 Sheets-Sheet 3

INVENTOR.
JERALD R. DEBENPORT, JR.
BY
McMorrow, Berman & Davidson
ATTORNEYS.

United States Patent Office 3,004,727
Patented Oct. 17, 1961

3,004,727
AUTOMATIC FILM CARTRIDGE LOADING MACHINE
Jerald R. Debenport, Jr., 1220 N. Parksdale Drive, Tyler, Tex.
Filed Feb. 26, 1960, Ser. No. 11,320
7 Claims. (Cl. 242—55.11)

This invention relates to apparatus for handling strip film, and more particularly to means for winding exposed motion picture film onto a film cartridge adapted to be employed in a developing machine.

A main object of the invention is to provide a novel and improved film rewinding device for combining several short rolls of exposed motion picture film into one large roll on a cartridge, which in turn can be placed in a film developing machine, the device being relatively simple in construction, being easy to use, and being arranged so that it is unnecessary to employ a dark room for splicing the small rolls of film.

A further object of the invention is to provide an improved film rewinding device for combining a number of short rolls of motion picture film into one large roll in a film developing cartridge, the device being relatively inexpensive to fabricate, being compact in size, being durable in construction, and being arranged to allow easy splicing of the end portions of the small rolls and to assure accurate splicing thereof, whereby the risk of film breakage within the developing machine is minimized.

A still further object of the invention is to provide an improved film rewinding device for combining a plurality of short rolls of motion picture film into a large roll in a film developing cartridge, the device being substantially automatic in operation, and being arranged so that a single person may splice the film and operate the developing machine associated with the film cartridge at the same time, thus providing a saving in labor cost in developing motion picture film.

Further objects and advantages of the invention will become apparent from the following description and claims, and from the accompanying drawings, wherein:

FIGURE 3 is a bottom view of the film rewinding device of FIGURES 1 and 2.

FIGURE 4 is a transverse vertical cross sectional view taken substantially on the line 4—4 of FIGURE 1.

FIGURE 11 is a schematic wiring diagram showing the electrical connections of the driving motor and switch members of the film rewinding device of FIGURES 1 to 4.

Figure 1:
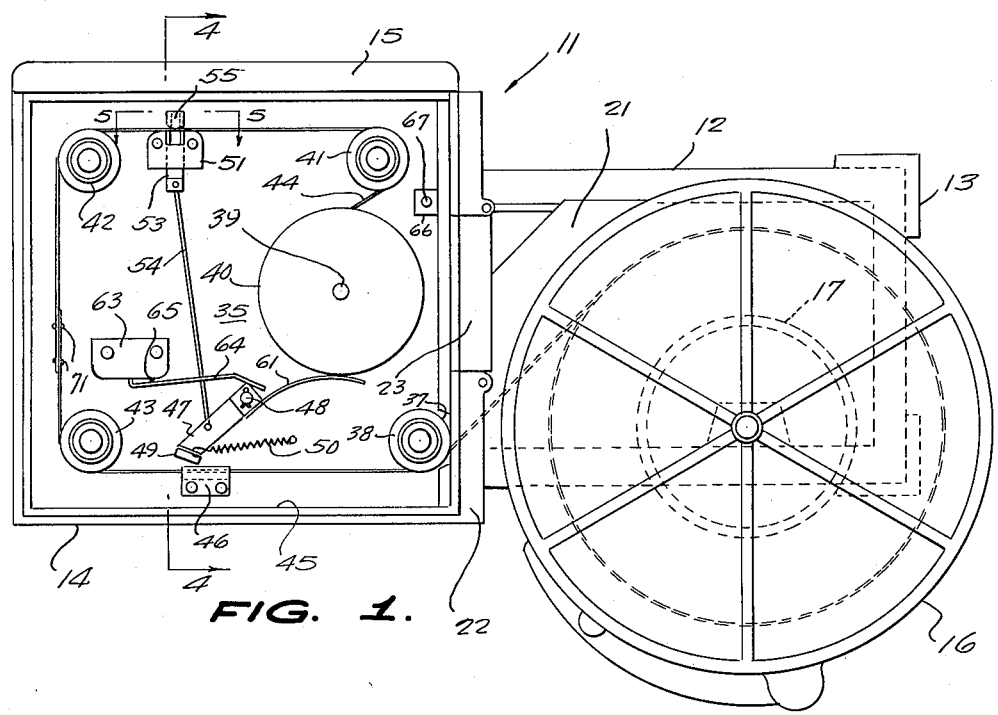
FIGURE 1 is a top view of an improved film rewinding device according to the present invention, shown with the hinged cover in vertical, open position.

Referring to the drawings, the film rewinding device is designated generally at 11 and comprises a support consisting of a generally rectangular base 12 provided with the depending corner supporting legs 13. Secured on one end portion of the base 12 is a substantially square housing 14 provided with a hinged top cover 15 which, when in its closed position, shown in FIGURE 4, provides a light-tight closure for the housing 14.

Figure 2:
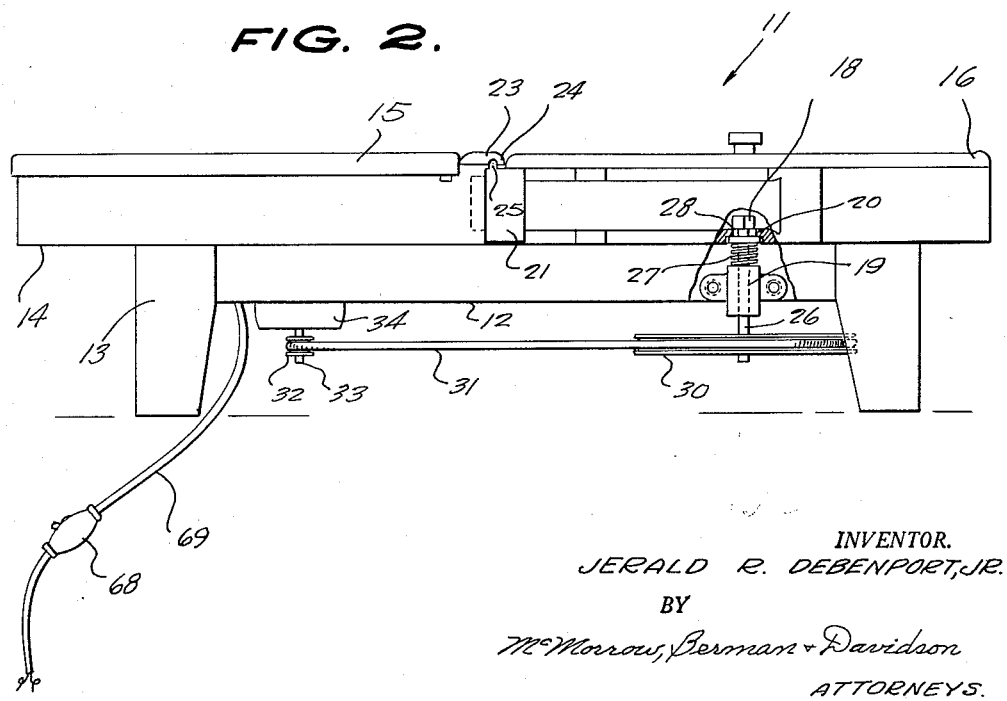
FIGURE 2 is a front elevational view, partly in vertical cross section, of the film rewinding device of FIGURE 1.

Designated at 16 is a conventional film strip developing cartridge which is removably supported on the opposite end portion of base 12 in side-by-side relationship with the fixed housing 14, the cartridge 16 containing a film developing reel 17 which is adapted to be drivingly engaged centrally at its bottom portion by a squared driving shaft 18 journaled in a vertical bearing bracket 19 mounted on the rectangular, frame-like support 12, as shown in FIGURES 2 and 4. The squared driving shaft 18 extends rotatably through a suitable aperture 20 provided centrally in the bottom wall of the film developing cartridge 16.

The film developing cartridge 16 is formed with an integral horizontal extension 21 which is adapted to be disposed in abutting relationship with the inwardly located transverse wall 22 of the housing 14, said wall 22 being provided on its top end with a retaining flange 23 extending over the abutment 21 and formed with a channeled marginal portion 24 which is adapted to lockingly receive an upstanding returning rib 25 formed on the horizontal extension 21, as shown in FIGURE 2. Thus, the squared shaft 18 is drivingly engageable with the squared aperture (not shown) of the conventional reel 17 contained in the cartridge 16, and cooperates with the channeled flange element 24 and the upstanding rib 25 to support the cartridge 16 on the frame-like support 12 in the position illustrated in FIGURES 1, 2 and 3.

The driving shaft 18 is provided with the reduced cylindrical main portion 26 which is rotatably engaged in the vertical bearing 19, the shaft 18 being resiliently supported by a coiled spring 27 surrounding the upper portion of the shaft element 26 and bearing between the top edge of the bearing sleeve 19 and a bearing washer 28 secured to the upper portion of shaft element 26 and rotatably received in a suitable countersink formed in the bottom wall of cartridge 16 subjacent the aperture 20, as shown in FIGURE 2.

A driving pulley 30 is secured to the lower end of the shaft element 26, and the pulley 30 is drivingly engaged by a flexible belt 31 which in turn is engaged on a drive pulley 32 secured to the depending shaft 33 of an electric motor 34. Motor 34 is secured to the bottom wall 35 of the housing 14, as is clearly shown in FIGURE 4.

The wall 22 of housing 14 is formed with an opening 37 which communicates with a film passage formed in the horizontal extension 21 of the cartridge 16 so that film may pass from the housing 14 through said passage to the interior of the cartridge 16 and may be wound on the reel 17. A suitably grooved vertical film guide spool 38 is rotatably mounted in the housing 14 adjacent to the film exit aperture 37, as shown in FIGURE 1.

A vertical spindle 39 is mounted in the housing 14, said spindle being adapted to receive a conventional motion picture film spool 40. Respective grooved film guide spools 41, 42 and 43 are journaled in the corner portions of the housing 14, as shown in FIGURE 1, to guide exposed motion picture film 44 from the spool 40 around the interior of the housing 14 to the exit guide spool 38, said guide spool 38 being located in the remaining corner portion of the housing adjacent the exit aperture 37, as above described.

Mounted between the film guide spools 38 and 43 adjacent the front wall 45 of housing 14 is an upstanding abutment member 46 adapted to be engaged by the portion of the film strip 44 located between the guide spools 38 and 43. Designated at 47 is a brake arm which is pivoted on a vertical upstanding pivot pin 48 located substantially midway between and inwardly spaced from the guide spools 38 and 43. Secured on the outer end of the brake arm 47 is a brake shoe 49 of suitable resilient deformable material, such as sponge rubber, or the like, which is clampingly engageable with the portion of the film strip supported between the spools 38 and 43, to clamp said portion against the stationary abutment member 46, responsive to counterclockwise rotation of the arm 47, as viewed in FIGURE 1. A coiled spring 50 is connected between the outer end of the arm 47 and the bottom wall 35 of housing 14 to bias the brake arm 47 in a counterclockwise direction, as viewed in FIGURE 1, namely, in a direction to exert clamping force on the portion of the film strip supported between the guide spools 38 and 43.

Secured to the bottom wall 35 of housing 14 between the guide spools 41 and 42 is a trigger guide member 51 which is located inwardly of the portion of the film strip supported between the spools 41 and 42 and which is formed with a transversely extending downwardly facing guide channel 52 in which is slidably disposed the transversely extending trigger bar 53. The end of trigger bar 53 is connected by a link rod 54 to the intermediate portion of the brake arm 47. The opposite end of the trigger bar 53 is formed with the upstanding abutment portion 55 adapted to be engaged by the lower portion of a section of film supported between the guide spools 41 and 42 and to be held outwardly against the tension of the spring 50 by said portion of film while the film is being wound on the cartridge reel 17.

Figure 8:
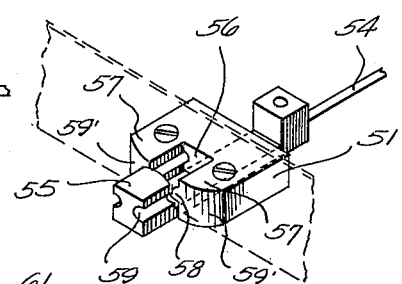
FIGURE 8 is a perspective view showing the trigger member and the trigger guide member associated therewith as employed in the film rewinding device of FIGURES 1 to 7.
Figure 9:
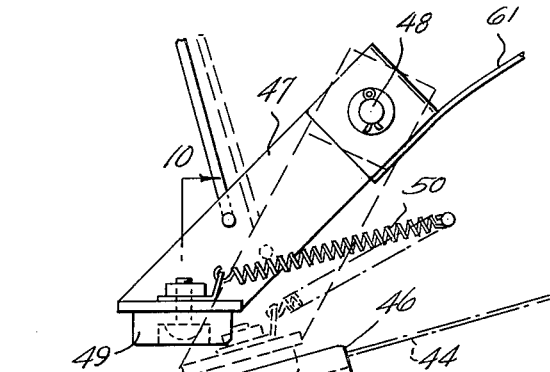
FIGURE 9 is an enlarged top view of the cooperating brake members provided on the film rewinding device of FIGURES 1 to 4.
Figure 10:
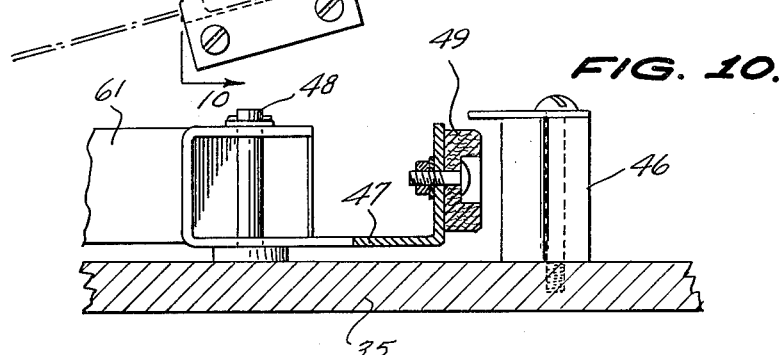
FIGURE 10 is a vertical cross sectional view taken substantially on the line 10—10 of FIGURE 9.

As shown in FIGURE 8, the trigger guide member 51 is formed with a rectangular notch 56 defining the side arms 57, 57 between which the upstanding abutment element 55 is slidably reecivable. The inside surfaces of the arms 57, 57 are formed with the inwardly projecting longitudinal guide ribs 58 which are slidably receivable in correspondingly shaped longitudinal guide ribs 59 formed in the opposite side surfaces of the upstanding abutment element 55, so as to positively guide said abutment element for transverse movement with respect to the film strip portion received between the inside surface of abutment element 55 and the adjacent end surfaces of the arms 57, 57. Said end surfaces of arms 57, 57 are preferably arcuately curved, as shown at 59', 59' to facilitate the smooth engagement of the lower portion of a section of film strip 44 with said surfaces 59' and to allow the smooth movement of the film strip past said surfaces.

Figure 5:
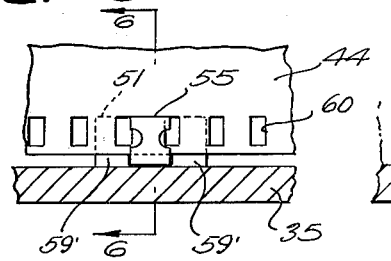
FIGURE 5 is an enlarged vertical cross sectional view taken substantially in the line 5—5 of FIGURE 1.
Figure 6:
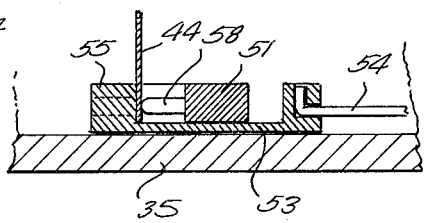
FIGURE 6 is a cross sectional view taken on the line 6—6 of FIGURE 5.
Figure 7:
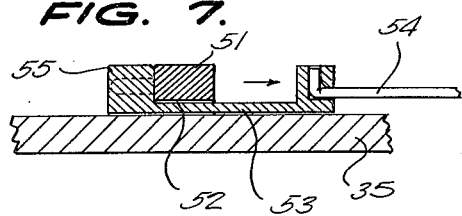
FIGURE 7 is a cross sectional view, similar to FIGURE 6, but showing the trigger member in its released position.

As shown in FIGURE 5, the abutment member 51 is preferably of a height such that the film strip 44 is engaged only adjacent the lower marginal portion thereof containing the film sprocket openings 60, whereby no contact is made with the portions of the film strip carrying the picture material.

As previously mentioned, the film strip holds the brake arm 47 in a retracted position, whereby it cannot exert clamping action on the portion of the film strip located between the guide spools 38 and 43 during the normal unwinding of the film from spool 40 onto the cartridge reel 17. However, when the film strip is completely unwound from the supply spool 40, and releases member 55, spring 50 rotates the brake arm 47 in a counterclockwise direction and causes the brake shoe 49 to clampingly engage the film and thus prevent the film from loosening from the cartridge reel 17 while another spool 40 is being furnished, as will be presently described.

Designated at 61 is an auxiliary brake element, comprising a leaf spring secured to the brake arm 47 and extending toward the spindle 39, said leaf spring 61 being frictionally engageable with the spool 40 responsive to the clockwise rotation of the brake arm 47 which occurs when the trigger bar 53 is released. Thus, when the brake shoe 49 clampingly engages the film strip between the spools 38 and 43, the leaf spring 61 simultaneously engages the spool 40. Thus, when a new spool 40 is inserted, the leaf spring 61 engages the new spool to prevent unwinding of the exposed film therefrom while the free end portion of the film strip from said spool 40 is being stapled to the free end portion of the previously wound strip of film.

Designated at 63 is a normally open switch which is mounted in the housing 14 adjacent the brake arm 47 and which is provided with the operating arm 64 which engages the inner end portion of brake arm 47 in the manner illustrated in FIGURE 1. The operating arm 64 is engageable with the actuating plunger 65 of switch 63 and holds the plunger 65 in its inward position while the brake arm 47 is in the position thereof illustrated in FIGURE 1, namely, is held away from the film strip portion between spools 43 and 38. This maintains the switch 63 closed as long as the film strip is engaged by member 55 to oppose the force of the biasing spring 50. However, when the trigger bar 53 is released, as above described, allowing the brake arm 47 to swing in a counterclockwise direction because of the biasing action of spring 50, the switch actuating arm 64 is likewise released, allowing the plunger 65 to move outwardly and causing the switch 63 to open.

As shown in FIGURE 11, the switch 63 is connected in the energizing circuit of the motor 34, so that motor 34 becomes deenergized automatically when trigger bar 53 is released.

A closure switch 66 is provided in the housing 14 adjacent the wall 22, said switch being normally open and being provided with an operating plunger 67 which is engageable by the top cover 15 when the cover is moved into closing position, as shown in FIGURE 4. The closure switch 66 is likewise connected in the energizing circuit for the motor 34, in series with the switch 63, as shown in FIGURE 11. A manually operated control switch 68 is likewise provided in the energizing circuit for the motor 34, the switch 68 being located, for example, in the line cord 69 provided for the device.

As shown in FIGURE 11, one terminal of motor 34 is connected directly to one of the line conductors 69, the other line conductor 70 is connected to the remaining motor terminal through the manual switch 68, the closure switch 66, and the trigger-controlled switch 63.

As is well known, in the process of developing motion picture film, it is necessary to combine a number of short rolls of film into a large roll which fills the cartridge 16. Usually a 1200 foot roll fits in the cartridge 16, whereas the spools 40 carry 100 feet or less of motion picture film. The purpose of the device of the present invention is to eliminate the need of a dark room in the process of splicing the small rolls, as well as to assure accurate splicing and to minimize the possibility of film breakage within the developing machine. Thus, to splice a small roll of film contained in a spool 40 to the end of the film contained in the cartridge 16, the spool 40 is placed in the housing 14 on the spindle 39 and the end of the film from the spool 40 is passed around the guide spools 41 and 42 and is spliced at 71 to the end of the film previously wound on the cartridge spool 17. As above mentioned, the film from the cartridge 17 is held between the brake shoe 49 and the abutment element 46 at this time, while the spool 40 is held by the leaf spring 61. This prevents unwinding of the film from the spool 40, as well as unwinding of the film previously wound on the cartridge reel 17. The amount of film exposed during the splicing procedure is relatively small and ordinarily comprises the unused end portions of the motion picture film which is normally wasted.

After the spool of film 40 is placed in the housing 14 in the manner above described, with a portion of the film from spool 40 received between the upstanding abutment element 55 and the trigger guide member 51, and after the film has been spliced at 71, as above described, the cover 15 is closed. Thus, the switches 66 and 63 are closed, and the motor 34 may be energized by closing the manually operated line switch 68. The spindle element 18 thus drives the cartridge reel 17 in a direction to wind up the motion picture film from spool 40, the film strip holding the brake arm 47 in a released position against the tension of the biasing spring 50. After the film has been completely unwound from the spool 40, the trigger bar 53 is released, causing the brake arm 47 to rotate counter-clockwise, as viewed in FIGURE 1, to its clamping position, while simultaneously causing the switch 63 to open. This deenergizes the motor 34 and at the same time clamps the end of the wound film so as to prevent it from unwinding from the cartridge reel 17. The empty spool 40 may then be removed and may be replaced by the next spool of motion picture film to be wound on the cartridge reel 17 after being spliced to the outer end portion of the previously wound film, as above described.

While a specific embodiment of an improved film rewinding device for transferring motion picture film from small spools to a larger reel in a developing cartridge has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatively receive a film spool, film guide means between said spindle and said film developing cartridge, said guide means including a movable trigger member mounted on said support and adapted to engage a first portion of the film from a spool mounted on said spindle, means biasing said trigger member in a direction substantially transverse to said first film portion, a normally open switch, an energizing circuit connected to said motor through said switch, means mechanically coupling said switch to said trigger member and holding said switch closed only while said first film portion engages the trigger member, means to clampingly engage a second portion of the film from said spool, and means to hold said last-named means in unclamping position while said first film portion engages said trigger means.

2. In a film rewinding device, a support, a driving shaft journaled on said support, a film developing cartridge, engaged with said driving shaft, an electric motor mounted on said support, means drivingly coupling said motor to said shaft, means on the support defining a light-tight enclosure, a spindle in said enclosure adapted to rotatively receive a film spool, film guide means between said spindle and said film developing cartridge, said guide means including a transversely moveable trigger member mounted on said support and formed with a projection adapted to engage a portion of the film from a spool mounted on said spindle, an abutment member on said support disposed between said spindle and said film developing cartridge, a brake member pivoted to said support adjacent said abutment member and located to engage a film portion and clamp same against said abutment, means biasing said brake member towards clamping engagement with said abutment member, means connecting said brake member to said trigger member, said biasing means biasing said trigger member in a direction transverse to said film portion, a normally open switch, an energizing circuit connected to said motor through said switch, and means mechanically coupling said switch to said trigger member and holding said switch closed only while said film portion engages said trigger member.

3. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatively receive a film spool, film guide means between said spindle and said film developing cartridge, said guide means including a transversely movable trigger member mounted on said support and formed with a projection adapted to engage a portion of the film from a spool mounted on said spindle, an abutment member on said support disposed between said spindle and said film developing cartridge, a brake member pivoted to said support adjacent said abutment member and located to engage a film portion and clamp same against said abutment member, means biasing said brake member towards clamping engagement with said abutment member, means connecting said brake member to said trigger member, said biasing means biasing said trigger member in a direction transverse to said film portion, a normally open switch, an energizing circuit connected to said motor through said switch, means mechanically coupling said switch to said trigger member and holding said switch closed only while said film portion engages said trigger member, and an auxiliary brake element projecting from said brake member towards said spindle and being of sufficient length to engage the spool on the spindle.

4. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatably receive a film spool, film guide means between said spindle and said film developing cartridge, said guide means including a transversely movable trigger member mounted on said support and formed with a projection adapted to engage a portion of the film from a spool mounted on said spindle, an abutment member on said support disposed between said spindle and said film developing cartridge, a brake member pivoted to said support adjacent said abutment member and located to engage a film portion and clamp same against said abutment member, means biasing said brake member towards clamping engagement with said abutment member, means connecting said brake member to said trigger member, said biasing means biasing said trigger member in a direction transverse to said film portion, a normally open switch, an energizing circuit connected to said motor through said switch, means mechanically coupling said switch to said trigger member and holding said switch closed only while said film portion engages said trigger member, an auxiliary brake element projecting from said brake member towards said spindle and being of sufficient length to engage the spool on the spindle, a hinged cover on said enclosure means, a normally open additional switch on said support connected in said energizing circuit, and means closing said additional switch when said cover is in closed position on said enclosure means.

5. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatably receive a film spool, film guide means between said spindle and said film developing cartridge, said guide means including a trigger guide member mounted on said support and located to engage portion of the film from a spool mounted on said spindle, a trigger member slidably mounted in said guide member for movement transverse to said film portion, means biasing said trigger member for such transverse movement, a normally open switch, an energizing circuit connected to said motor through said switch, and means mechanically coupling said switch to said trigger member and holding said switch closed only while said film portion engages said trigger member.

6. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatably receive a film spool, film guide means between said spindle and said film developing cartridge, said guide means including a trigger guide member mounted on said support and located to engage a portion of the film from a spool mounted on said spindle, a trigger member slidably mounted in said guide member for movement transverse to said film portion, an abutment member on said support disposed between said spindle and said film developing cartridge, a brake member pivoted to said support adjacent said abutment member and located to engage a film portion and clamp same against said abutment member, means biasing said brake member towards clamping engagement with said abutment member, means connecting said brake member to said trigger member, said biasing means biasing said trigger member for such transverse movement, a normally open switch, an energizing circuit connected to said motor through said switch, and means mechanically coupling said switch to said trigger member and holding said switch closed only while said film portion engages said trigger member.

7. In a film rewinding device, a support, a driving shaft journaled on said support, a film developing cartridge engaged with said driving shaft, an electric motor mounted on said support, means drivingly coupling said motor to said shaft, means on the support defining a light-tight enclosure, a spindle in said enclosure adapted to rotatably receive a film spool, film guide means between said spindle and said film developing cartridge, said guide means including a trigger guide member mounted on said support and located to engage a portion of the film from a spool mounted on said spindle, a trigger member slidably mounted in said guide member for movement transverse to said film portion, an abutment member on said support disposed between said spindle and said film developing cartridge, a brake member pivoted to said support adjacent said abutment member and located to engage a film portion and clamp same against said abutment member, means biasing said brake member towards clamping engagement with said abutment member, means connecting said brake member to said trigger member, said biasing means biasing said trigger member for such transverse movement, a normally open switch, an energizing circuit connected to said motor through said switch, means mechanically coupling said switch to said trigger member and holding said switch closed only while said film portion engages said trigger member, an auxiliary brake element projecting from said brake member towards said spindle and being of sufficient length to engage the spool on the spindle, a hinged cover on said enclosure means, a normally open additional switch on said support connected in said energizing circuit, and means closing said additional switch when said cover is in a closed position on said enclosure means.

References Cited in the file of this patent

UNITED STATES PATENTS

| | | |
|---|---|---|
| 1,561,699 | De Ybarrondo | Nov. 17, 1925 |
| 2,626,760 | Chick | Jan. 27, 1953 |